(12) United States Patent
Calmer (10) Patent No.: US 7,104,038 B2
(45) Date of Patent: Sep. 12, 2006

(54) STRATEGIC SPATIAL REALIGNMENT FOR ATTACHING CORNHEADS TO COMBINES

(75) Inventor: Marion Calmer, 550 N. Knox Rd., Alpha, IL (US) 61413

(73) Assignee: Marion Calmer, Alpha, IL (US)

( * ) Notice: Subject to any disclaimer, the term of this patent is extended or adjusted under 35 U.S.C. 154(b) by 0 days.

(21) Appl. No.: 09/827,563

(22) Filed: Apr. 6, 2001

(65) Prior Publication Data

US 2002/0144492 A1  Oct. 10, 2002

(51) Int. Cl.
*A01D 57/00* (2006.01)
(52) U.S. Cl. .......................................... 56/219; 56/14.9
(58) Field of Classification Search ................ 56/14.9, 56/57, 103, 104, 105, 109, 110, 113, 119, 56/208, 210, 219, 220, 221, DIG. 9, 16.4 R, 56/16.6; 460/16, 25, 26, 119
See application file for complete search history.

(56) References Cited

U.S. PATENT DOCUMENTS

| | | | | |
|---|---|---|---|---|
| 4,115,983 A | * | 9/1978 | Barnes et al. ................. 56/111 |
| 4,266,392 A | * | 5/1981 | Knepper et al. ......... 56/DIG. 9 |
| 4,327,544 A | * | 5/1982 | McDuffie et al. ............. 460/16 |
| 4,612,757 A | * | 9/1986 | Halls et al. .................... 56/208 |
| 5,464,371 A | * | 11/1995 | Honey .......................... 460/20 |
| 5,784,869 A | * | 7/1998 | Rayfield ...................... 460/114 |
| 5,799,483 A | * | 9/1998 | Voss et al. ................... 460/119 |
| 6,330,782 B1 | * | 12/2001 | Digman et al. .............. 56/14.5 |

* cited by examiner

*Primary Examiner*—Meredith Petravick
(74) *Attorney, Agent, or Firm*—Jay R. Hamilton (57) ABSTRACT

The corn harvesting unit and the attachment modifications for connection to the threshing unit provide an improved flow of material from the row to the threshed grain in the combine. These modifications of structure and the resultant spatial changes to the variety of the conveying systems used from the row to the grain tank of the combine result in a novel and more efficient harvesting machine. The spatial relationship between the powered and the un-powered conveying systems moving in different directions permits improved flow and flow rates reducing plugging and power consumption. Material is lifted through a lesser angle of the inclined plane from the ground to thresher unit. In operation a smooth uninterrupted flow of material from the row unit to the cross auger through the dead space (energy wise) to the retrieving area of the feeder house is provided for.

9 Claims, 7 Drawing Sheets

Fig. 7

STRATEGIC SPATIAL REALIGNMENT FOR ATTACHING CORNHEADS TO COMBINES

BACKGROUND OF THE INVENTION

This invention relates to corn harvesting machinery, specifically the spatial relationship between the exit area of the corn header and the retrieving area of the combine feeder house. The corn header contains a plurality of row units to strip and separate the ears from the stalk, a cross auger and trough for delivering harvested material to the feeder house. The combine feeder house contains a chain slat undershot conveying system for retrieving material from said corn head and delivering harvested material to the threshing system, of which all are existing art.

The crop dividers in combination with the gathering chain(s) and stripper plates as in the prior art have always retrieved the crop from near ground level into the row units. The stripper plates in combination with the stalk rolls will strip and separate the ears with minimal amounts of mog (material other than grain). Said gathering chain(s) then feed the heterogeneous material (ears and mog) into the cross auger and trough. The cross auger is located between the exit point of the row units and in front of the feeder house opening. The cross auger then delivers this material to the feeder house for conveying to the combine for ultimate threshing and separating.

This results in power being required to move this crop on an inclined plane at three stages of the conveying process. This first stage of the conveying process is in the row unit where there is adequate power and crop engagement for elevating the crop from near ground level into the cross auger and trough. The second stage of conveying is accomplished by the combination of the transverse cross auger and trough. The cross auger has flighting on it, which applies power to the material horizontally in the cross auger trough, thus having changed the motion which was in line with the combine and the row unit to a lateral movement to the exit area of the cross auger trough. This material is then fed into the third stage of the conveying process, the feeder house of the combine. Thus the second stage of movement of the crop is a result of being contained against the floor and vertical side of the cross auger trough. The two lateral sections of the cross auger are oppositely wound and meet in the middle so that the horizontal movement of the crop from the right side and the left side of said cross auger meet and create a mass to be transferred to the feeder house.

At the entrance to the feeder house, the back vertical wall of the cross auger trough, in front of the feeder house, is removed so that the material may be fed from the cross auger floor into the feeder house and most of the movement imparted to the mass of material assembled at the entrance is toward the feeder house.

This movement is imparted by the cross auger rotation but is applied at the point of exit to push the mass up a severe inclined plane. Force is no longer imparted to the inert material (dead space). The material must have adequate energy imparted to propel the crop up this severe inclined floor or plane to the retrieving area of the third conveyor.

Because the flow pattern of the material is through a dead space and simultaneously severely up hill the material tends to slow down and continue to pile up as material pushes against material.

In the past thirty years two things have changed. #1 yields have doubled through improved genetics, fertilization, populations, and row spacings. #2 harvesting machines are larger with increased horse power and ground speeds which require corn headers with more row units. These two factors in combination have significantly increased the flow rate and mass of material being delivered by said corn head and retrieved by said feeder house to a level that can now cause build up, back feeding, tossing of mog onto the deck covers, fluff, tossing of ears onto the ground, and resultant plugging in the cross auger feeder house area.

BRIEF SUMMARY OF THE INVENTION

This invention provides for improved corn head performance i.e., better material flow and less congestion and more even feeding of the harvested crop to the feeder house conveyor. Strategic realignment or changes the spatial relationship of the exit area of the corn header and the retrieving area of the combine feeder house so as to decrease the inclined plane during this flow.

This invention can theoretically reduce up to 100% the angle of the total inclined plane between the lowest point of the cross auger trough and the retrieving point of the feeder house conveyor.

This invention provides that the force and energy required to move the material from the lowest point in the cross auger trough through a dead space to its retrievable position in the feeder house is reduced.

This invention provides a flexible feeding plate, which can conform to the cylindrical path swept by the feeder house chain and slat conveyor thereby increasing the conveyors ability to successfully retrieve the maximum amount of material capable of being carried by the chain slat conveyor. The energy imparted by the cross auger to said grain is now adequate for movement. In prior art the area from the lowest point of the cross auger trough to the retrieving point of the feeder house conveyor did not conform to the cylindrical path swept by the feeder house chain and slat conveyor. This non-conformity inhibits the ability to achieve maximum loading capabilities.

This invention provides that hoods and grills may no longer be necessary for ear retention.

This invention provides a flexible elastomeric feeder plate for a lateral constant plane and seal between the cross auger trough and the feeder house floor during lateral tilt harvesting operations such as on contoured terrain.

The invention has a smooth uninterrupted improved flow of material from the corn header through the dead space to the retrieving area of the combine feeder house. When the material is retrieved the feeder house conveyor imparts a direct and positive motion up the inclined plane into the combine. Until this invention there has been little improvement in this area of total material flow.

DETAILED DESCRIPTION OF THE INVENTION

Figures 1, 2:
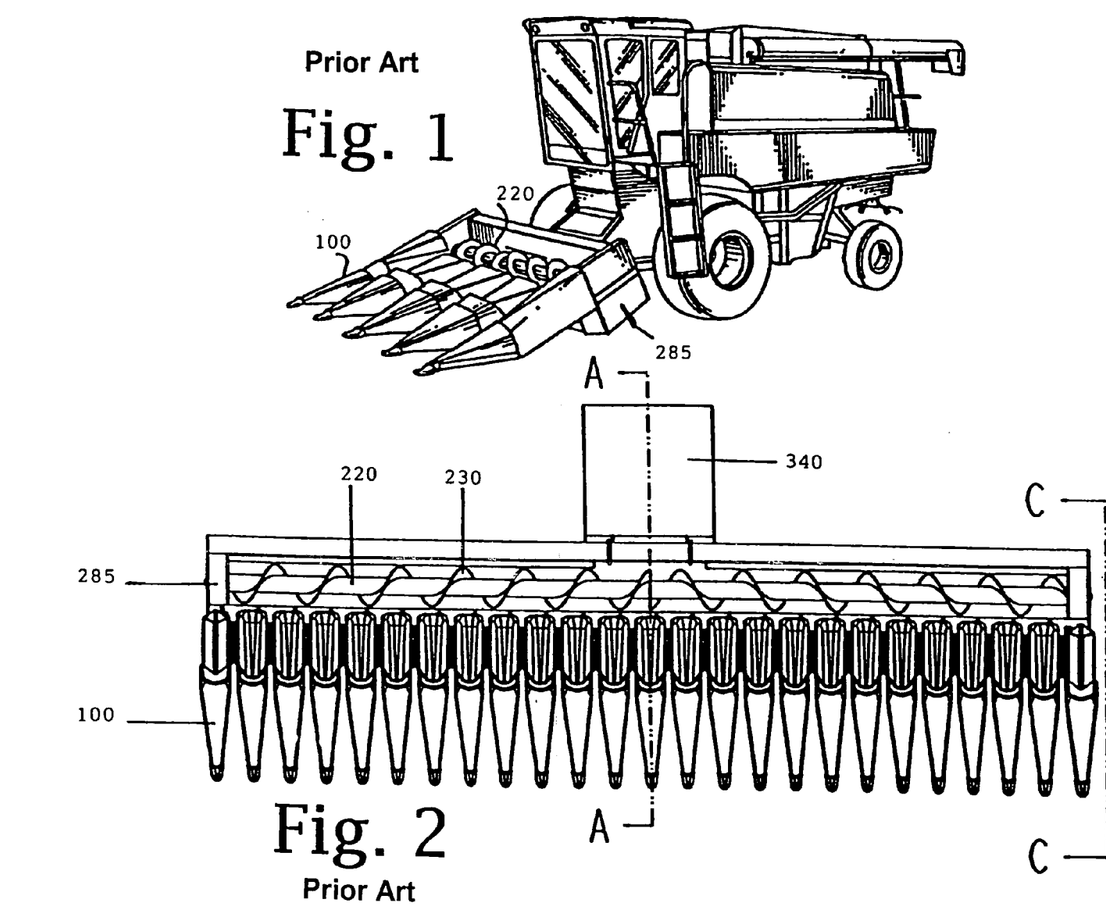
FIG. 1—is a plan view of a combine with a corn head attached.
FIG. 2—is a top view of the corn head, cross auger and feeder house row units.
Figure 3:
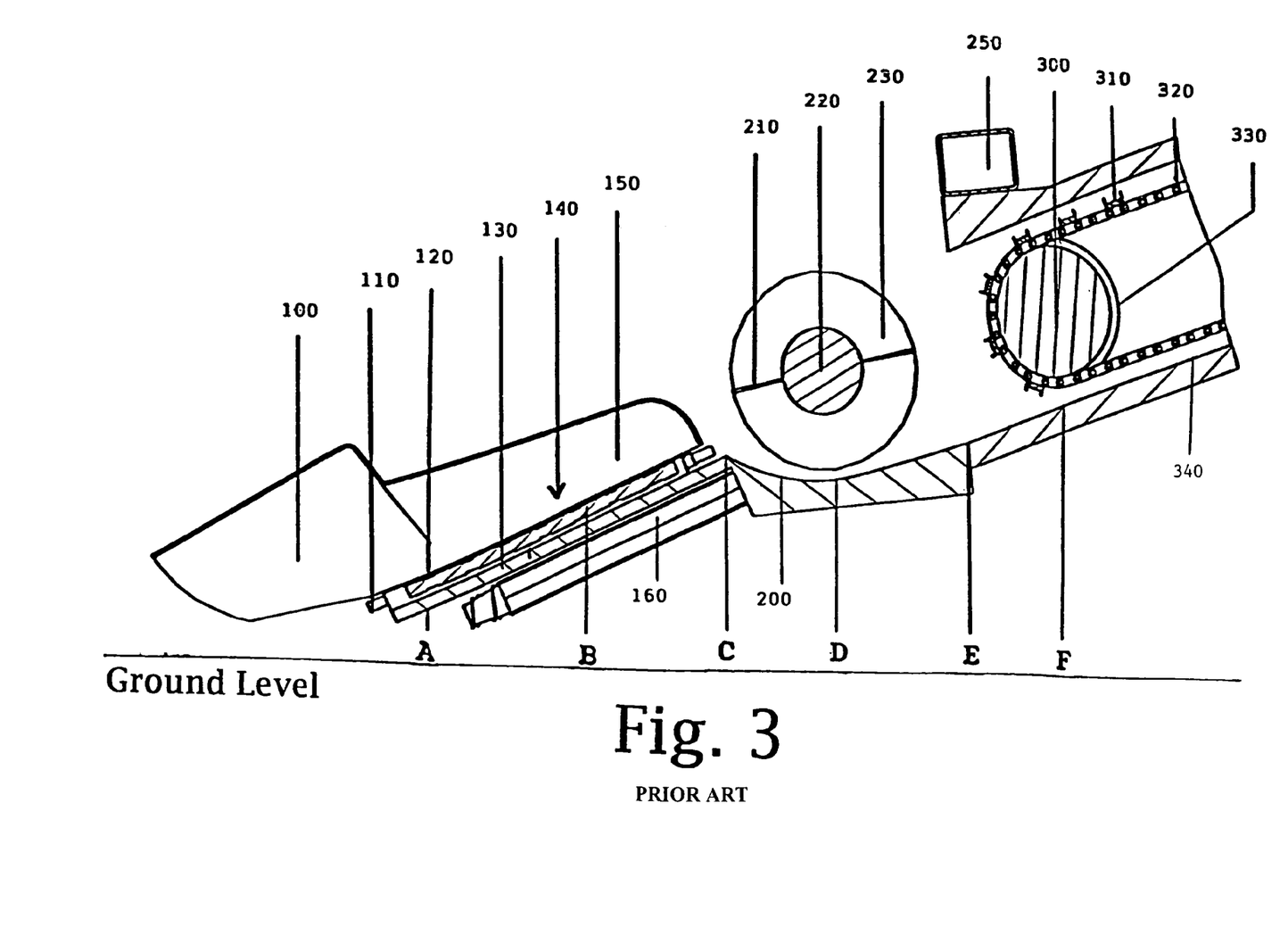
FIG. 3—is a sectional view A—A of the row unit, cross auger, trough, feeder house, and conveyor of the prior art.

The operation of corn heads incorporating this invention are similar to that of the operation of corn heads of the prior art as illustrated in FIGS. 1, 2, and 3. In FIGS. 3, 4, 4a, 5 and 6 the corn stalks are engaged by the gathering chains 120 guided into the snapping slots 140 formed by stripper plates 130. The snapping rolls 160 pull the corn stalks through the snapping slots 140 and the ears are removed from the stalks, point B, as they come into engagement with the stripper plates 130. The ears are then carried rearwardly by the gathering chain fingers 110 and deposited in the trough 200 that contains the auger 220 with flighting 230.

The power to drive the gathering chains 120 and the snapping rolls 160 is provided from a main drive shaft through a gear box as described in prior art.

As shown in FIG. 3, the crop must proceed from point A, up the inclined plane by the power imparted to it by the gathering chains 120 through point B to point C where the crop is deposited into the auger trough 200 for lateral movement to the exit point E area of the auger trough 200 by the auger 220 having flighting 230 thereon. The primary movement of material by the flighting is horizontal so energy is imparted to the material i.e., the ears of corn plus mog primarily rearwardly and laterally. The auger trough 200 has its vertical rear side removed when it is opposite the feeder house 340 and the feeder house chain 320. Thus the material has had some energy imparted to it from the gravitational movement from point C to point D, which is the low point of the travel of the material in the cross auger trough 200. Now the material must be, as shown in FIGS. 3, 4, 4a, 5, and 6, forced by the cross auger from position D over the edge of the cross auger trough E and to the retrieving point F of the feeder house 340. The feeder house chain 320 can not be too close to the cross auger flighting 230 because of the interference which would result from two parts moving in opposite directions and powered for such movement.

Thus the material which has accumulated at the exit point is forced laterally i.e., rearwardly up the inclined plane by the motions of the flighting 230. This motion must overcome gravity, friction, and the weight of the material being pushed by a force that is not totally in line with the direction of movement desired, as is the case of force and movement when it reaches the feeder house chain 320.

This invention as shown in FIGS. 4, 4a, 5, and 6 spatially realigns specifically the cross auger trough 200 and the cross auger portions of the header 220 and the entry to the feeder house 340. There is a resultant improved movement of material with the same power by this realignment.

The realignment provides reduced energy requirements for propelling the crop or to assist in propelling the crop in its movement from the cross auger trough 200 to the feeder house 340 where it is engaged by the feeder house chain 320 and slats 310 for further powered movement. This realignment is accomplished as shown in FIGS. 4, 4a, 5, and 6 by inserting a vertical spacer 240 or 255 to elevate the header bar 250 vertically. The spacer 240 is attached to the corn head frame 250 by means of a bracket 260 which may be held by similar and any well-known fastening means to secure 250 and 260 together. Vertical spacers 245 and 255 are also attached by well-known fasteners but not shown.

Figure 4:
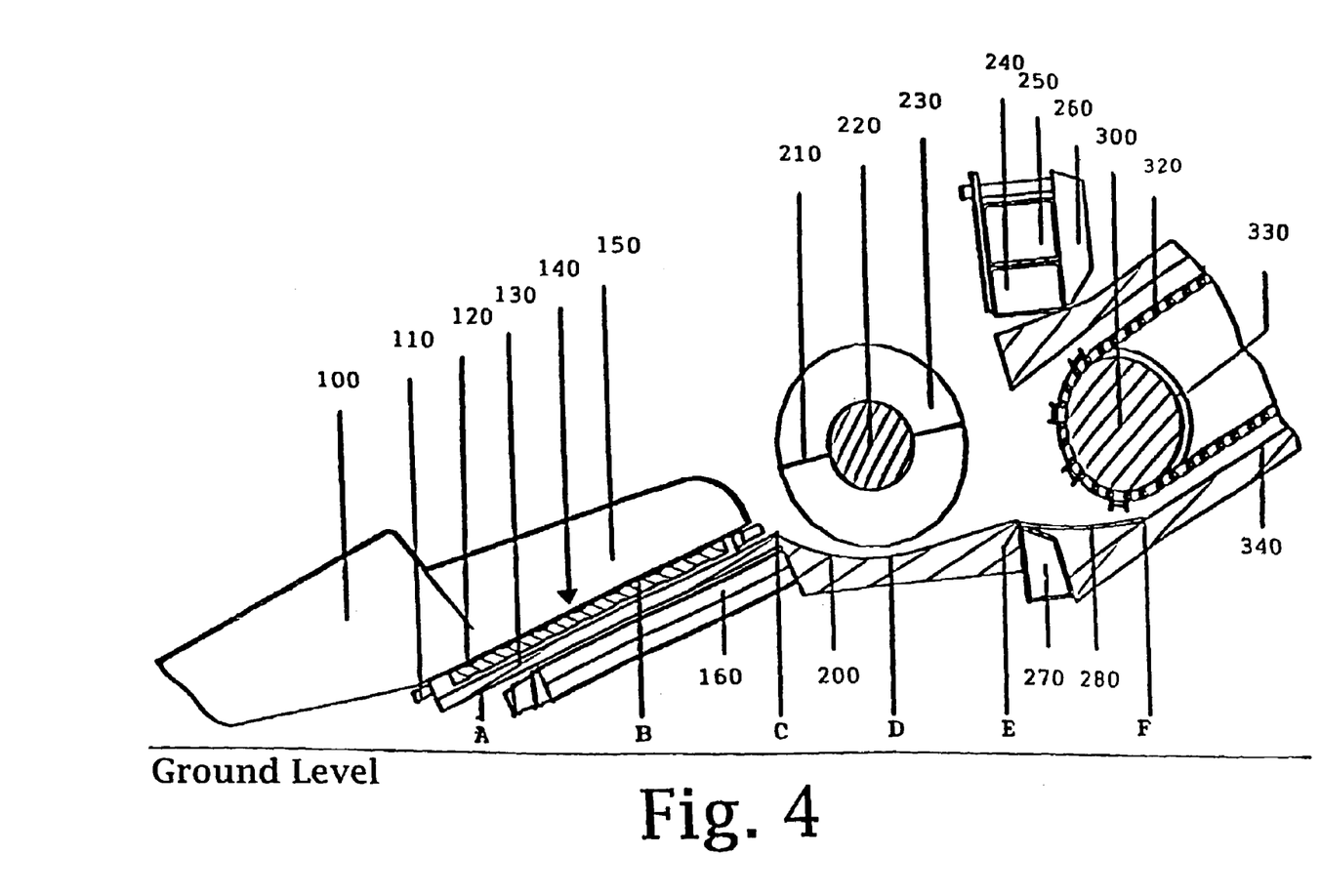
FIG. 4—is a sectional view A—A of the row unit, cross auger, trough, feeder house, and conveyor of the prior art including present invention.
Figure 4A:
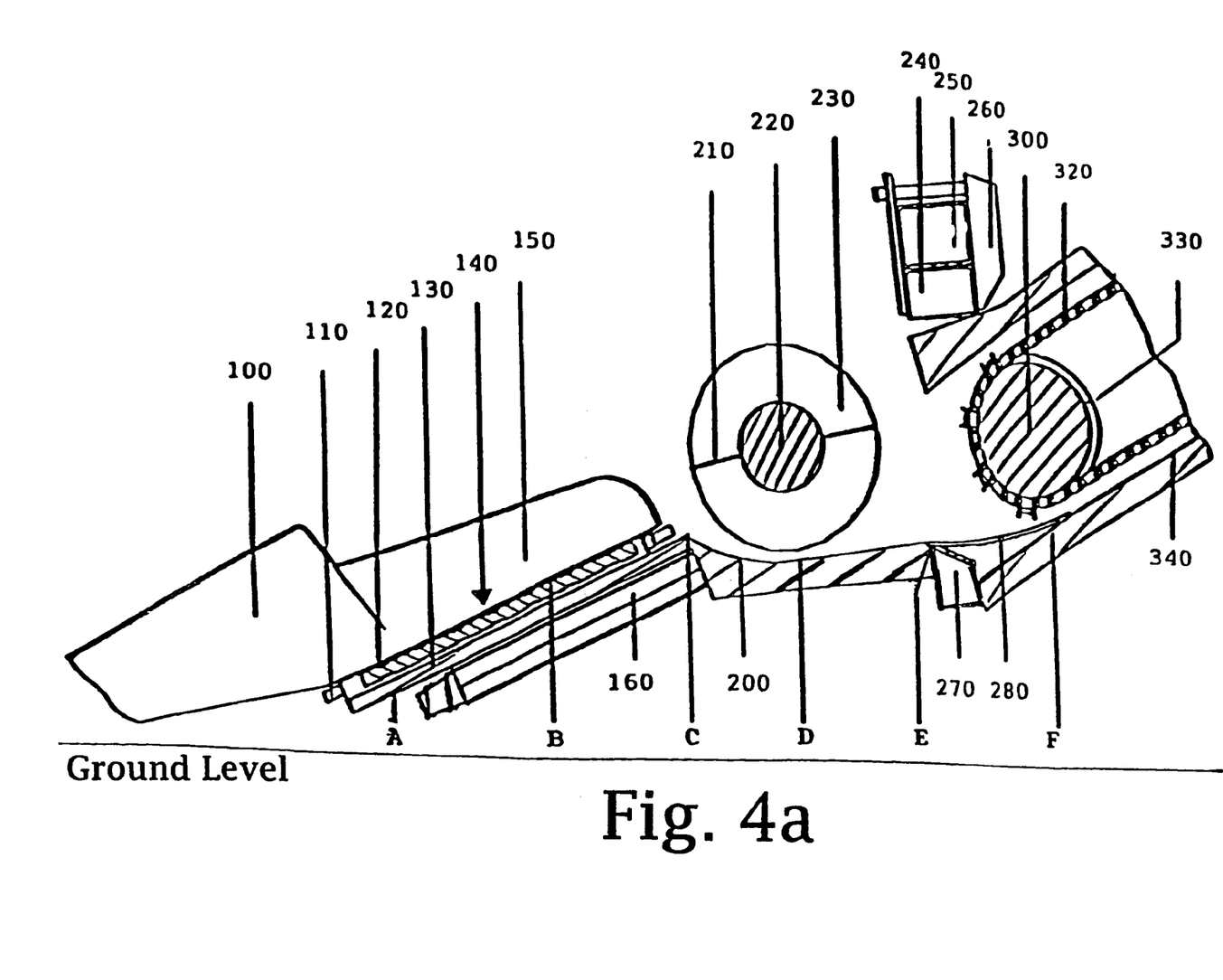
FIG. 4a—is a modification of the tray or trough in FIG. 4.

In FIGS. 4 and 4a, when the vertical spacer is inserted the entire corn head is lifted vertically so that the flighting 230 and paddles 210 will possibly interfere with the feeder house chain 320. Thus to permit the raising of the entire corn head, point E must be moved laterally in a direction away from the feeder house chain 320. This movement is accomplished by the insertion of a lateral spacer 270 between the auger trough 200 and frame of the feeder house 340 at its lowest portion. To maintain lateral spacer 270 in its position a fastening means must be provided. Lateral spacer 270 may be fastened to the cross auger 200 trough by any well-known means such as bolts or welding.

In order to prevent discharge of the material onto the ground through the void created by insertion of lateral spacer 270 a flexible or rigid filler plate 280 must be inserted between the cross auger trough 200 and the feeder house tray 340 and attached with common fasteners.

FIG. 4a shows the invention with lowering only to the aft portion of auger trough 200 in front of feeder house 340.

Figure 5:
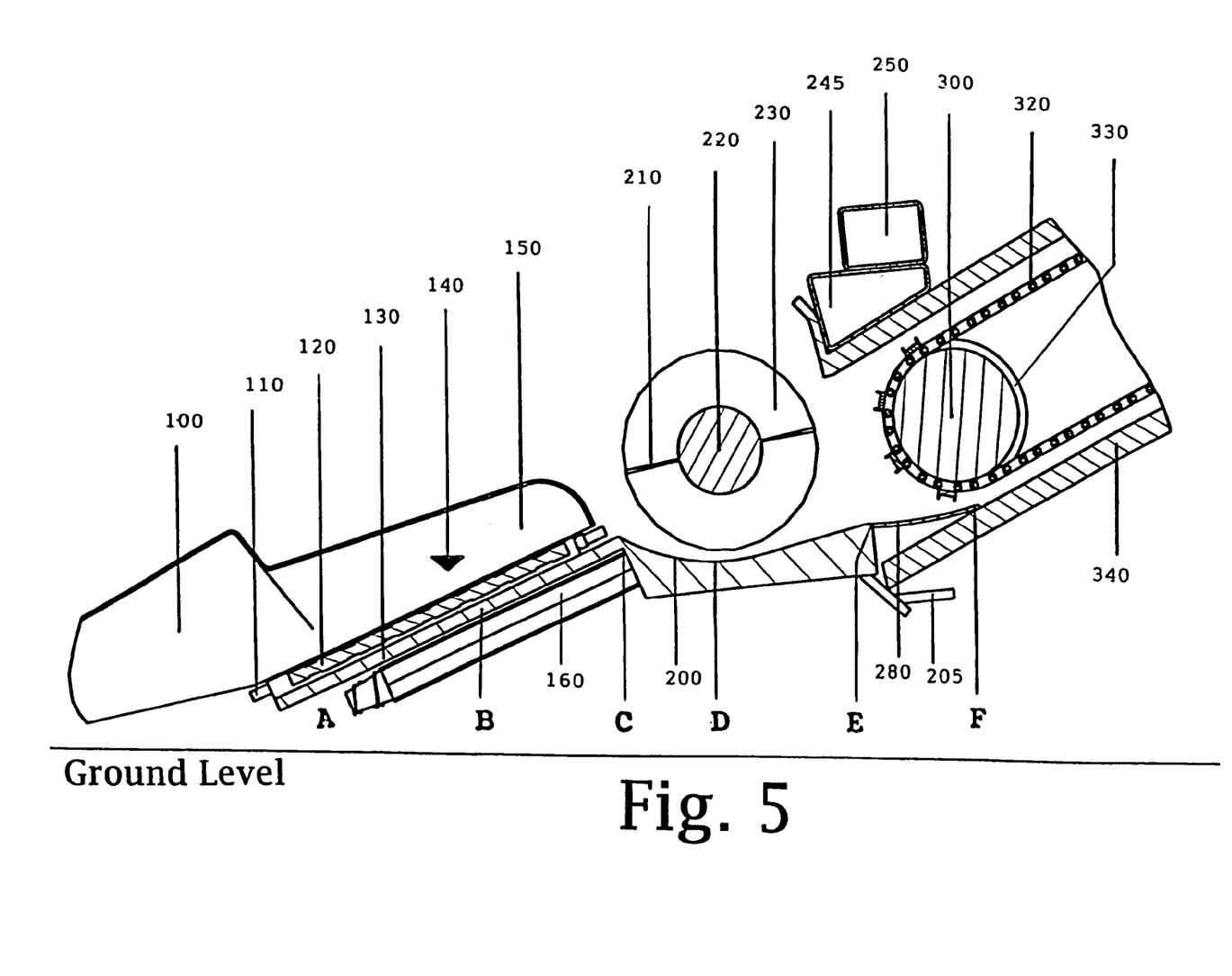
FIG. 5—is a sectional view A—A of another embodiment of the invention.

A further embodiment of this invention is shown in FIG. 5 wherein the function of the lateral spacer 270 and vertical spacers 240 or 255 are combined in one unit as trapezoidal spacer 245. This trapezoidal spacer 245 is formed as shown in FIG. 5 so that it both horizontally and vertically changes the spatial relationship between the feeder house 340 and the exit of cross auger floor 200. This embodiment could be done if it is desirable with different combine headers to move the auger flighting 230 closer to the feeder house chain 320. A flexible filler plate 280 is still necessary, which then forms a cylindrical surface to be swept by the path of the feeder house conveyor chain 320. A fastening member is provided to hold the cross auger trough 200 and the feeder house 340 together by a fastener means 205 to ensure that the members remain in position at all time, including park.

Figure 6:
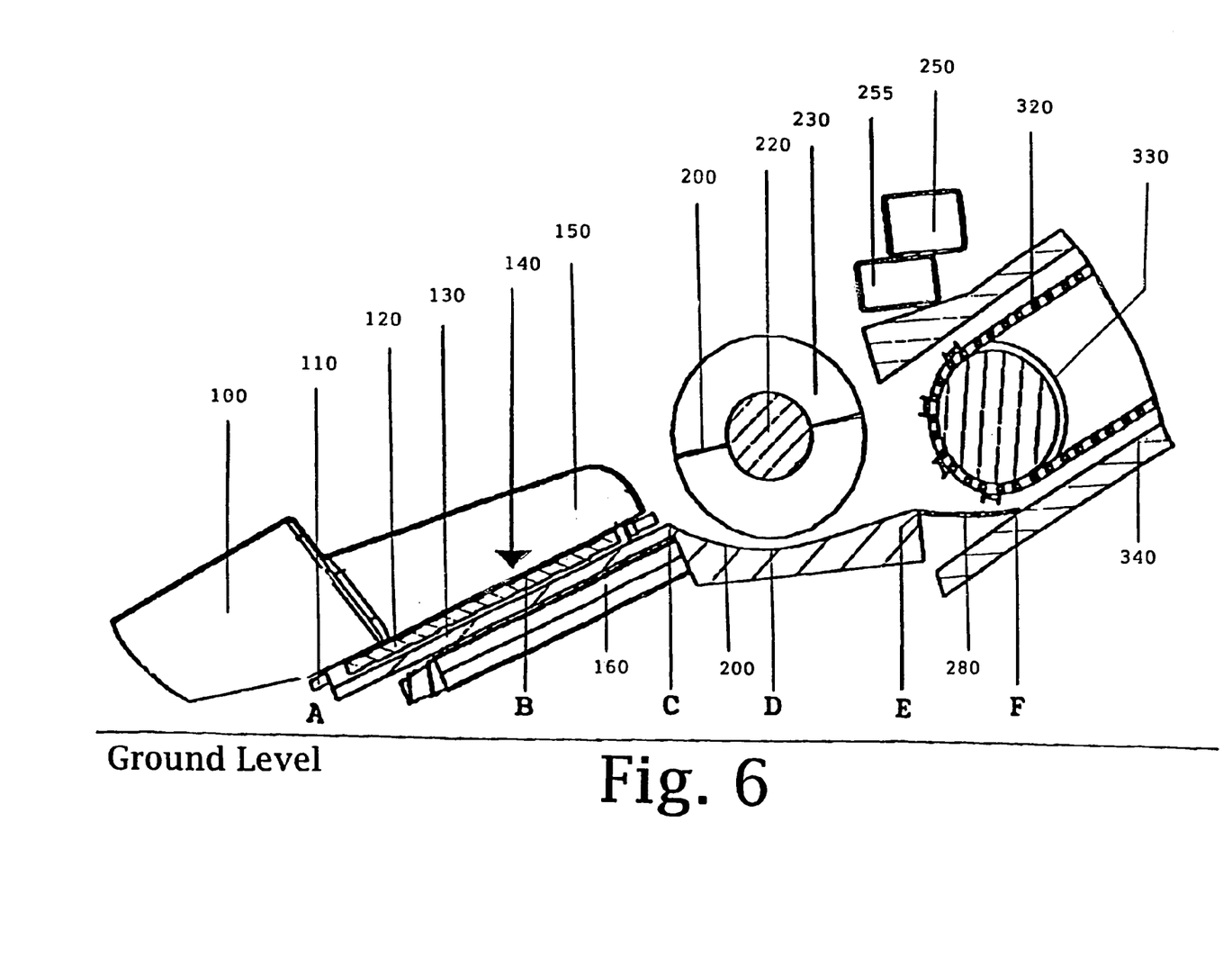
FIG. 6—is a sectional view A—A of a further embodiment of this invention

A further embodiment is shown in FIG. 6 wherein the vertical spacer 255 is inserted between the frame 250 and the feeder house 340. This vertical spacer 255 is fastened to the corn head frame 250 in the same manner as vertical spacer 240 in FIG. 4. There is also shown in FIG. 6 the flexible feeder plate 280, which conforms to the cylindrical path swept by the feeder house chain 320. The flexible feeder plate 280 also maintains a seal between the trough 200 and the feeder house 340 during lateral tilt.

Figure 7:
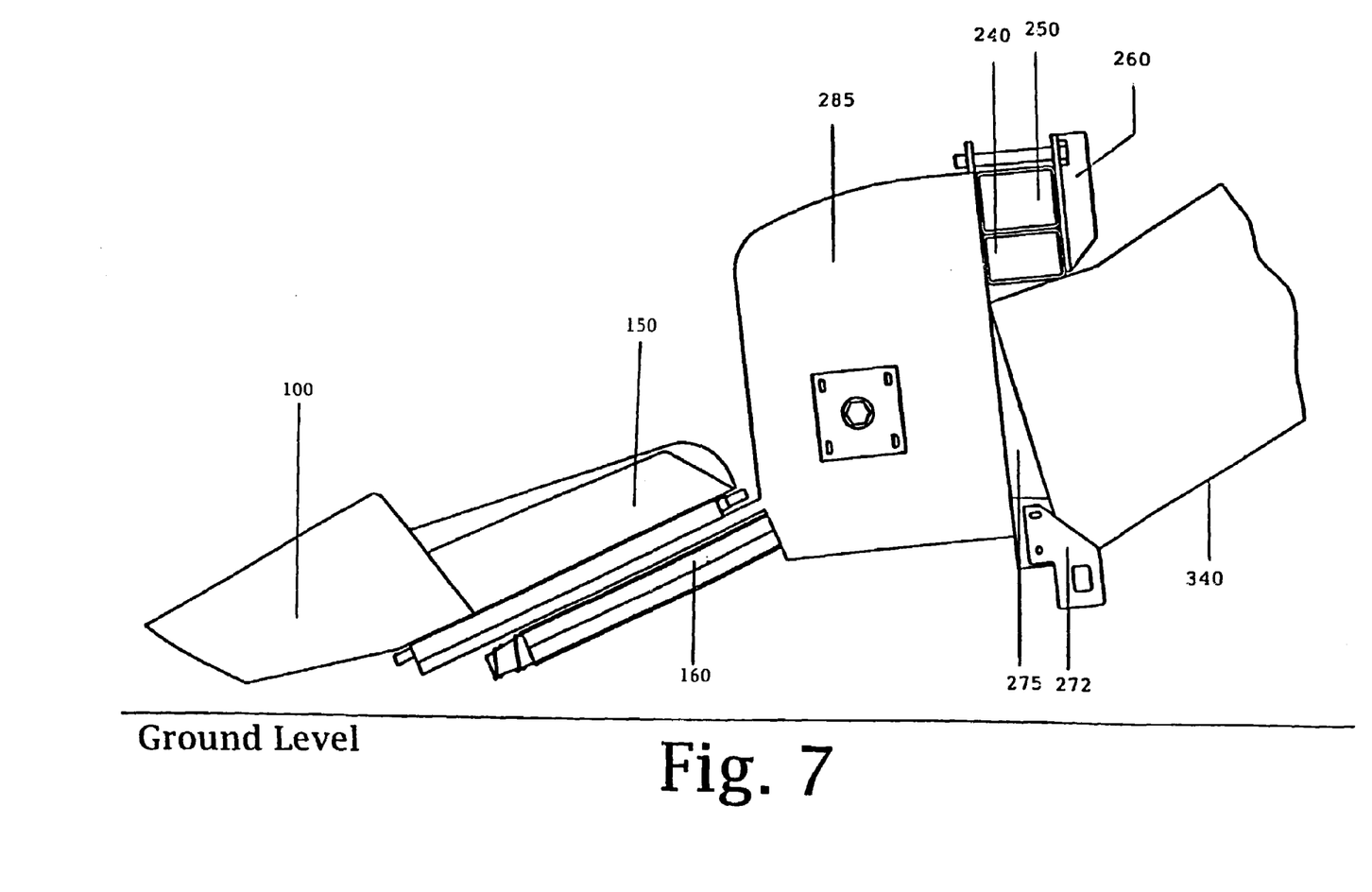
FIG. 7—is an end view of the header of this invention showing the filler plate and a different fastener between the header and the feeder house.

FIG. 7 is an end view of the invention showing the vertical spacer 240, frame member 250, feeder house 340, and the filler plate 275 between the feeder house 340 and the rear vertical wall of the cross auger trough 200. The corn head and feeder house are connected by fastening means 272 to ensure that they remain in position at all time including park.

Having described the preferred embodiment, other features of the present invention will undoubtedly occur to those versed in the art, as will numerous modifications and alternations in the embodiments of the invention illustrated, all of which may be achieved without departing from the spirit and scope of the invention as defined in the appending claims.

What is claimed is:

1. An apparatus improving the arrangement of and spatial relationship between both the functional elements of a row crop harvester for mounting to a mobile threshing unit, and a mobile threshing unit, wherein the functional elements of the row crop harvester and the mobile threshing unit include:
    i. a row crop harvester, having a main frame, for attachment to and mounting upon a mobile harvesting threshing unit;

ii. a first conveyor system in said row crop harvester including a power source, said power source connected to a plurality of row units mounted on said main frame, said row units for harvesting grain material growing upon stalks, said first conveyor system conveying said harvested grain material up a first inclined plane to exits from said first conveyor system;
iii. a second conveyor system at right angles to said first conveyor system, said second conveyor system receiving said harvested grain material from the exits of said first conveyor system, wherein said second conveyor system comprises a power source, an auger with flighting and a curved trough containing said auger;
iv. said auger cooperating with said curved trough to convey said harvested grain material from the exits of said first conveyor system to an area at the center of said auger for exit from said second conveyor system;
v. a third conveyor system, including a power source, in said mobile threshing unit for retrieving said harvested grain material in said open area and delivering said harvested grain material to the thresher mechanism of said mobile threshing unit,
vi. said second conveyor system connected to said third conveyor system by an open area between the exit of the second conveyor system and the entrance of said third conveyor system wherein the improvement is comprised of:
  i. a section of said second conveyor auger trough, located at the center of the auger, allowing said grain and stalk material to pass over said auger trough to the entrance of said third conveyor system, wherein a surface of said auger trough section is substantially flat from the center of the auger trough through the exit of said second conveyor system to the entrance of said third conveyor system; and,
  ii. a vertical spacer inserted between said row crop harvester attachment and said mobile threshing unit to reduce the difference in height between the entrance of said third conveyor system and the height of the second conveyor system so that the angle of an incline plane between the second and third conveyor systems is reduced allowing the second conveyor system and the entrance to the third conveyor system to operate in substantially the same horizontal plane.

2. The apparatus in accordance with claim 1 wherein auger flighting is reversed on opposite sides of the centerline of said auger.

3. The apparatus in accordance with claim 1, wherein said first and second conveyor systems are moved vertically upward in relation to said third conveyor system an amount sufficient to reduce the angle of an incline from said second conveyer system exit to the entrance of said third conveyor system.

4. The apparatus in accordance with claim 1, wherein a feeder plate is attached to said second conveyor system for bridging between said second conveyor system and said third conveyor system.

5. The apparatus in accordance with claim 4, wherein said feeder plate is made of elastomeric material to allow movement between said second and third conveyor systems while maintaining the connection between said second and third conveyor systems.

6. The apparatus in accordance with claim 1, wherein the lateral distance between the second and third conveyor systems is reduced by moving laterally the connection of the header unit relative to the mobile threshing unit and thereby reducing the angle of the inclined planes.

7. The apparatus in accordance with claim 6, wherein said lateral movement between said first and second conveyor system and said third conveyor system is by a lateral spacer.

8. The apparatus in accordance with claim 7, wherein the lateral spacer is rectangular in shape.

9. The apparatus in accordance with claim 7, wherein the lateral spacer is a trapezoidal piece between the header unit and the threshing unit.

* * * * *